Jan. 5, 1954
M. LARSON
2,664,593
MOLDING APPARATUS
Filed July 30, 1949
2 Sheets-Sheet 1
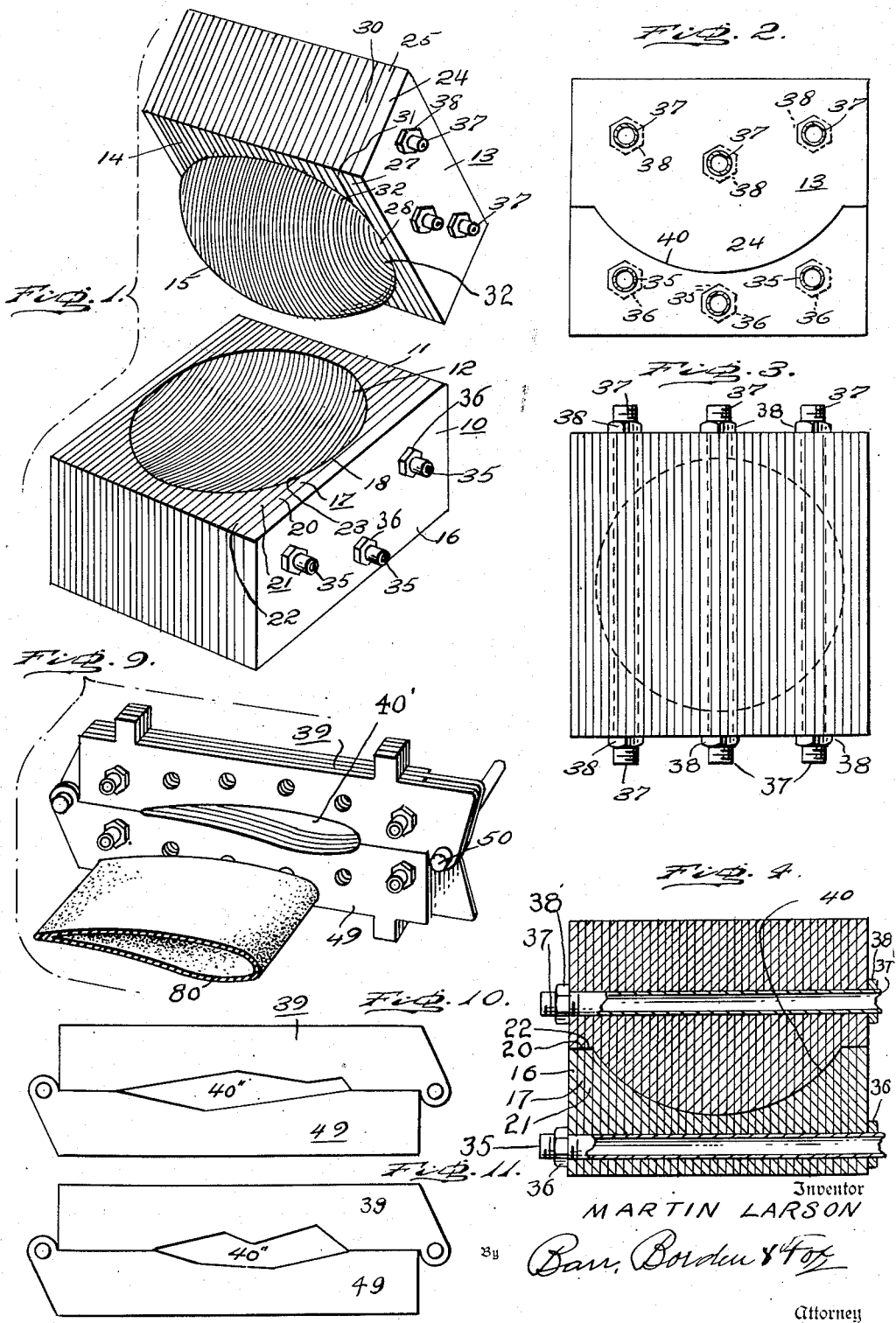
Inventor
MARTIN LARSON
By Barr, Borden & Fox
Attorney

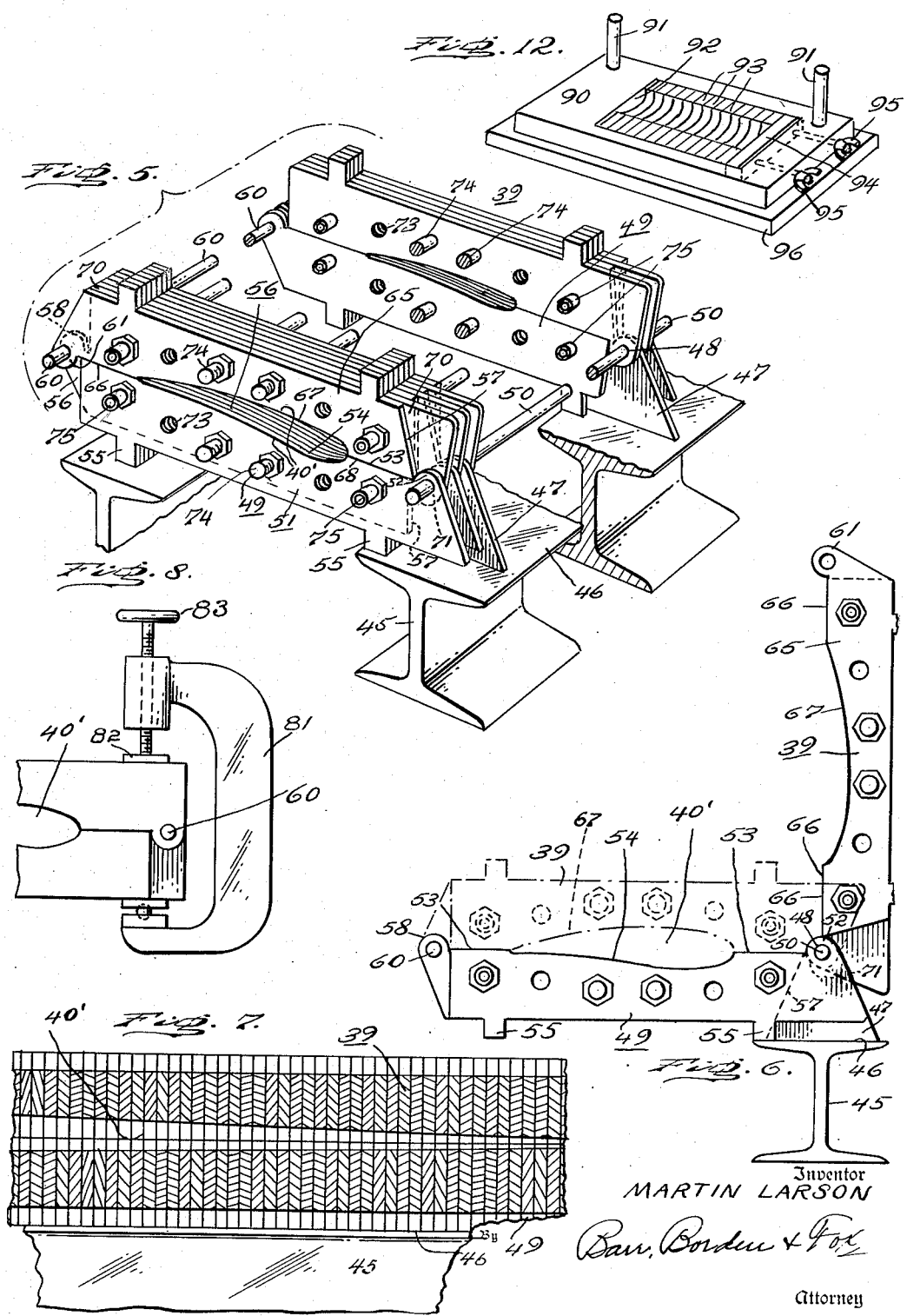

Patented Jan. 5, 1954

2,664,593

UNITED STATES PATENT OFFICE 2,664,593

MOLDING APPARATUS

Martin Larson, Upper Darby, Pa., assignor to Richard H. Prewitt, trading as Prewitt Aircraft Co., Wallingford, Pa.

Application July 30, 1949, Serial No. 107,718

7 Claims. (Cl. 18—35)

This invention relates to forming and molding materials and articles, and particularly to molding and shaping apparatus.

While the art of molding and shaping articles is ancient indeed, there are many shapes and forms which are irregular, or possessed of various changes in contours, which involve expensive and time-consuming methods for forming a shaping or molding apparatus therefor, and which, therefore are formidably expensive.

It is among the objects of the present invention to provide a simple, cheap and accurate apparatus for the manufacture of dies and fixtures for forming and shaping articles and materials; to improve the art of molds; to provide a quickly assembled forming apparatus which can readily be changed to accord with desired changes in the contour of the shaped article; to provide an improved apparatus for shaping articles which is especially conducive to the introduction of heat or pressure or both into the shape-forming portions of the apparatus; to provide improved details of construction of forming apparatus by which cheaply but accurately made mold components can be assembled in hinged relation and arranged for enclosing engagement with the article and predisposed for locked relation of the mold components during "curing" of the article; to provide a mold or die which can be partially or wholly changed in contour quickly and cheaply; to provide an apparatus which is especially useful in forming certain structural members such, for instance, as airfoils and the like, for aircraft; to provide improved shaping apparatus by which, illustratively, the rotor blade shown in Prewitt application Serial Number 724,836, can be quickly and cheaply fabricated; to provide a mold comprising multiple sections each formed of a plurality of individually fabricated laminations; to provide a mold formed of respectively mating laminations; to provide a mold having a mold cavity defined by plural laminations and of greater accuracy than a gouged out mold cavity; to provide a mold of great strength and uniform distribution of stresses; and other advantages will become more apparent as the description proceeds.

In the accompanying drawings forming part of this specification:

Fig. 1 represents an exploded perspective of two complemental portions of a die or shaping apparatus according to a simplified illustrative version of the invention, to exemplify the principles incorporated therein;

Fig. 2 represents a transverse section through the assembled mold of Fig. 1, taken between laminations;

Fig. 3 represents a plan of the assembled mold of Fig. 1;

Fig. 4 represents a longitudinal vertical section through the mold of Fig. 1;

Fig. 5 represents a fragmentary perspective of a mold or material shaper according to another embodiment of the invention, with portions removed for clarity incorporating a hinge between the mold portion;

Fig. 6 represents an end elevation, with the parts of the mold of Fig. 5 in open hinged relation to admit of the material to be worked, showing in dotted lines the upper movable mold portion in lowered, seated molding relation to the relatively fixed lower portion thereof;

Fig. 7 represents a fragmentary longitudinal vertical section through the complete mold of Fig. 5, showing the progressive change in profile of the mold interior longitudinally of the mold to show one of the important advantages thereof;

Fig. 8 represents a fragmentary end elevation of the mold of Fig. 5 at the locking end thereof, showing a mechanism for forcing the halves together and for retaining them in such forced association during completion of the molding, as a supplement to, or replacement of the locking pin shown in Fig. 5;

Fig. 9 represents a fragmentary perspective of a portion of the mold of Fig. 5, with a section of inflatable or expansible bag or like compressive and heating element for insertion into and cooperation with the molding aperture of the mold;

Fig. 10 represents an end elevation of a mold assembly like that of Fig. 5, modified to show an irregular shape for the formed article;

Fig. 11 represents an end elevation of the other end of the mold of Fig. 10, showing that the change in profile or contour of the aperture in the mold, dimensionally progressively of the mold in one dimension, may be in various directions and proportions.

Fig. 12 represents a perspective of a further modified form of the invention.

While there are important additional features and advantages of the structures to be described, it will be understood that basically the mold comprises upper and lower halves disposed in complemental relation to define together a mold cavity of desired displacement and proportion in the mold, with each mold half comprised of a plurality of relatively thin laminations, individually stamped, and shaped, both as regards the opposite complemental laminations to form the proper sectional profile of the mold cavity or aperture in the respective planes of the aligned laminations, and also individually shaped as regards the laterally adjacent or contiguous laminations, shapes or profiles as to merge thereinto to form a relatively smooth internal mold cavity in the mold portions.

Referring to Figs. 1 to 4 for an exemplification thereof, the mold comprises a lower stationary mold half or portion 10, having in its upper planar surface 11 the semi-spherical cavity 12. The movable upper mold portion or half 13 in its lower planar surface 14 carries the semi-spherical convexity 15. Lower half 10 is formed of a plurality of laminations as of stampings of metal, or of cuttings of wood or the like, of any desired external profile so far as the bottom and sides and ends are concerned, but each having an upper surface arranged to form part of the planar upper surface 11, and a portion of the concavity 12. Illustratively, the lower mold may have an end board 16 as a relatively wide terminal lamination. This is for the purpose of spreading tension arising from bolts to be described. To this is juxtaposed an adjacent lamination 17 having a slight segmental central depression 18 in a larger area of planar portion 20 in the plane of the surface 11. Inwardly of the end board, the next adjacent lamination 21 has a shorter planar portion 22 and a slightly larger shallow depression 23. And so on, to the center of the mold portion, with progressively deepening central depressions and smaller planar portions, and, from the center to the far end, the reversal thereof. The respective laminations therefor, while each contributing laterally to the strength and solidity of the whole, also define small transverse sections of the total concavity. The upper mold portion 13 is complementally formed with an end board forming a planar portion 25 meeting the planar surface of end board 16 when the mold portions are assembled. Next thereto is lamination 26, having an incomplete planar area 27 interrupted toward the center by the slightly protuberant shallow extension 28, forming the edge of the convexity 15. The next adjacent lamination 30 has a smaller planar area 31 interrupted by the protuberance 31. The latter is longer and higher than the first protuberance 28, and this progressive increase maintains to the center. When reaching the center the reversal of proportions of laminations begins to form the symmetrical protuberance 15, analogous to the formation of the complemental concavity 12.

The multiple laminations of the bottom or lower mold portion 10 are held together suitably by through bolts or the like, and preferably the connectors comprise heating pipes 35, extending through all of the laminations of mold portion 10 and held tightly therein by nuts 36. Similarly, the upper mold portion is held together by a plurality of steam or like heating pipes 37, clamped by nuts 38 bearing tightly against the sides of mold portion 13.

The mold cavity in this illustrative case comprises the slight space 40 between the meeting confronting surfaces of the respective concavity and convexity. With such an illustrative mold a semi-spherical dimple or protuberance can be formed in a sheet of material, such as metal or plastics or the like, with the proper application of pressure between the two halves of the mold. In the illustrative case the laminations preferably are in respective alignment in common planes, with a lamination in the bottom half complemental in shape to the lamination of the upper half.

It will be seen that it is a cheap and expeditious proceeding to take a plurality of unformed laminations, such as of boards, and cut the top or bottom edge surface to the upper configuration to form the desired overall shape of mold or shaping device, when respectively assembled in the proper juxtaposed order with properly cut contiguous boards in series. Sheet metal or plate metal stamping can similarly be formed and assembled. The greater the accuracy desired, the thinner the respective laminations. Preferably, in addition to the through bolts, the sheets or laminations are secured together with adhesive or the like.

The anchoring of the component laminations by means of a heating pipe arrangement secures the solidity and practical homogeneity of the mold halves, with the additional virtue of impressed heat for heating material within the aperture 40 of the assembled mold. This renders the mold highly efficient in shaping a sheet of plastic or the like, or in setting thermosetting adhesives or the like.

In the preferred exemplification in which the article to be shaped is relatively elongated, as, purely illustratively, in the formation of a rotor blade or the like, the same principle of laminar construction is utilized, but in detailedly different manner. Thus, referring to Fig. 5, a fixed support, such as elongated rail or the like 45 is provided, of I beam construction, having an upper flange surface 46. In substantial relative parallelism, in generally evenly spaced relation longitudinally of the surface 46, are the plurality of triangular supporting plates 47, each having a single pivot pin aperture 48, with the several apertures in alignment longitudinally of the series, to receive and support an elongated pintle pin 50. Pin 50 forms the pivotal connection between the fixed lower half mold portion 39, and the arcuately adjustable upper half mold portion 49, to be described.

Starting with the left side of the device of Fig. 5, the lower half of the complete mold is defined by the end lamination 51, having the single upwardly projecting eye 52 at the pivot end for receiving the pintle 50 upon which it is threaded. The upper surface of the lamination below the eye 52 comprises the planar upper edge 53 interrupted by the shaped depression or molding cavity-forming recess 54. The lower edge of the lamination 51 includes at least one of the feet 55, to support the lower mold half of the surface 46 of the I beam 45. The lamination 51 is provided and all other laminations of the lower mold portion 39 are provided with a series of transverse apertures for purposes to be described. Attached inwardly to the end lamination 51 of the lower mold portion 49 in horizontal substantial alignment therewith, is the sub-lamination 56, formed at the upper and lower edge similarly to the analogous edges of the lamination 51. The left hand end of the sub-lamination is provided with the upwardly projecting locking eye 58, to receive the locking pin 60. The lamination 51 and sub-lamination 56 considered as a unit have a single eye for pivotal swinging, at one end of the unit, and a single eye for locking at the other end of the unit. These components and the others to be described are secured together by adhesives or the like. The lower mold portion is completed by a series of alternate laminations and sub-laminations, all secured together.

The upper portion or mold half 39, starting at the left side in Fig. 5, comprises the sub-lamination 65 having the lower surface formed of the planar edge 66 on opposite sides of the recess 67, complemental to the oppositely extending recess 54 of the lower lamination 51. Lower lamination 51 and upper sub-lamination 65 are in common vertical planes normal to the pivot pin 50.

The upper sub-lamination 65 preferably terminates at the end remote from pivot pin 50, in the downwardly projecting locking eye 61. The sub-lamination 65 is juxtaposed to and aligned laterally in part with the lamination 70 having the lower surface aligned laterally generally in mold relation to the lower edge of the sub-lamination 65, lying vertically in the plane of the corresponding lower sub-lamination. The upper lamination 70 is preferably provided with the downwardly projecting pivotal eye 71 through which the pintle 50 passes. The upper mold portion 39 is formed of alternate laminations and sub-laminations. The entire mold, formed of the relatively pivoted upper and lower mold portions 39 and 49 is thus formed of alternate full and partial laminations, i. e., with laminations and sub-laminations, so that spaced chordwisely of the mold there are a plurality of aligned respectively upwardly and downwardly projecting pivot eyes on one side, and a plurality of aligned respectively upwardly and downwardly projecting locking eyes, at the other side of the mold. From time to time, longitudinally of the mold, a pivot eye as recited is omitted, to permit the insertion into the plane of that lamination of one of the triangular supporting plates 47. The upper and lower mold portions 39 and 49 define the mold cavity 40'.

The respective laminations and sub-laminations of each half are transversely bored or pierced as at 73 with all of the respective apertures in alignment so as to receive the longitudinally extending anchoring or bonding rods 74, and the heat-conducting pipes or tubes 75. Through this means the halves are held rigidly in material shaping and forming relation while suitable heat can be introduced as to maintain the work under suitable elevated temperatures.

It is a feature of the invention that the mold portions and mold cavities as provided be arranged for or susceptible to association with expansible elements, in order either to increase the molding or sealing pressures at selected points or areas, or to form internal cores between which and the mold cavity surfaces, the work can be compressed. Especially is this a feature in conjunction with the introduction of heat thereinto. Thus, referring to Fig. 9, in an illustrative form thereof, the mold portions define the mold cavity 40' and an inflatable hollow bag 80 is provided, collapsible upon itself for insertion into and removal from the mold cavity 40'. The bag 80 may be such as to fill the mold cavity when expanded, or to fill selected portions only thereof, relying upon inert more or less solid and rigid filling blocks to fill the remainder of the space.

It has been observed that the specific profile or contour of the mold cavity will be that necessary for the particular problem involved. It obviously need not be that of an airfoil as has been illustrated in certain of the figures. Thus, referring to Figs. 10 and 11, the mold cavity 40'' may be irregular and asymmetrical and of different profiles at different points along the mold as disclosed at the respective ends of the mold.

It will be understood that whereas with the usual molding or shaping problem, the use of the locking pin to hold the parts in tightly assembled relation may be preferred, in the form, for instance, shown in Fig. 5, this is not essential. In Fig. 8 an alternative or additive form of mechanism is shown. This comprises a C clamp 81 having the threaded and adjustable plunger 82, actuated by the hand wheel 83. The C clamp 81, or a series thereof spaced longitudinally of the mold, are each disposed to engage the upper and lower mold portions 39 and 49, and with suitable manipulations to gradually force the halves together to exert molding or shaping pressure upon the material in the mold cavity. This pressure can be maintained by the clamps, if desired, or it can be assumed by the locking pin 50, and the clamps removed for use on another mold.

It will be apparent that the mold portion comprised solely and completely of laminations as shown in the previously described figures is not the only exemplification of the invention that may be made. For instance, as shown in Fig. 12, a rectangular frame 90 is provided carrying, for instance, the guide pins 91, (as, of course, may also be provided in the other forms of the invention to insure proper registration of the component parts). In the rectangular central opening 92 the plurality of properly surfaced and proportioned laminations 93 are mounted and are squeezed together into a rigid die member by the end plate 94, the compression of which is controlled by the thumb screws 95. The assembly rests upon the rigid base plate 96, and forms a die member for the restricted surface disclosed. In this connection it will be clear that the die member constructed as disclosed herein does not necessarily need a complemental die portion and a mold cavity.

The laminations can be used to build up any desired form of single forming member, with reference to which shaping and forming can occur. Thus, the laminated shape constructed in accordance with this invention can be associated with the high hydraulic or fluid pressure diaphragmatic press having such success at the present in shaping sheet and other metal and like articles to conform to single male entities. The single die is forced against a sheet of metal, backed by a tough rubber diaphragm, and the latter is subjected to high hydraulic pressure to force conformation of the sheet of metal against the male member under the enclosing pressure of the diaphragm.

It will be understood that wherever used in the specification and claims, the term "adhesives" is intended to be broad enough to cover glues, cements, thermosetting and thermoplastic compounds, brazing, soldering, and other forms of more or less permanent attachment of the laminations to each other. In some cases the attachment of the laminations, as in Fig. 12, can be purely frictional without adhesives or their equivalents, relying upon external lateral pressure to maintain the alignment, and this is of particular value when the forming or shaping part must be dismounted for removal from the shaped article form, or for quick changes in contours.

Having thus described my invention, I claim:

1. A mold formed of complemental mold portions, each mold portion being formed of a plurality of laminations having ears at one end, and sub-laminations terminating short of said ears of said laminations, said laminations and sub-laminations being disposed in alternating lateral juxtapositioning to form a mold portion, means holding the respective laminations and sub-laminations in tight lateral juxtaposition, said ears at said one end of the laminations of one mold portion being disposed to support a pivot pin, a pivot pin, said ears at one end of said other mold portion being disposed to pivotally engage said pin to relatively pivot the mold portions together with interleaving of the respective ears to maintain the rigidity of the mold portions.

2. A mold formed of complemental mold portions, each mold portion being formed of a plurality of laminations each having an ear at one end, and sub-laminations each having an ear at the other end, said laminations and sub-laminations being disposed in alternating lateral juxtapositioning and each stopping transversely of the mold portion short of the ear of the other to form a substantially solid mold portion having aligned ears on each side separated by the thickness respectively of the laminations and the sub-laminations, said ears at said one end of the laminations of one mold portion being disposed to support a pivot pin, a pivot pin, said ears at one end of the laminations of said other mold portion being disposed to pivotally engage said pin to relatively pivot the mold portions together with interleaving of the respective ears to form a substantially solid column of ears at the pivot line, said ears at the said other end of the respective sub-laminations being disposed to permit securing the mold portions together with interleaving of ears forming a substantially solid column of ears opposite to said pivot pin by a locking pin, and a removable locking pin engaging said last mentioned ears.

3. A mold formed of complemental mold portions, each mold portion being formed of a plurality of laminations having ears at one end, and sub-laminations each having an ear at the other end, said laminations and sub-laminations being disposed in alternating lateral juxtapositioning bonded together with adhesives to form a mold portion, said ears at said one end of the laminations of one mold portion being disposed to support a pivot pin, a pivot pin, said ears at said one end of said other mold portion being disposed to pivotally engage said pin to relatively pivot the mold portions together, said ears at said other end of the respective sub-laminations being disposed to permit securing the mold portions together opposite to said pivot pin by a locking pin, a removable locking pin engaging said last mentioned ears, and means for rigidly holding the respective laminations and sub-laminations of the respective mold portions together.

4. A mold formed of complemental mold portions, each mold portion being formed of a plurality of laminations having ears at one end, and sub-laminations each having an ear at the other end, said laminations and sub-laminations being disposed in alternating lateral juxtapositioning to form a mold portion, said ears at said one end of the laminations of one mold portion being disposed to support a pivot pin, a pivot pin, said ears at said one end of said other mold portion being disposed to pivotally engage said pin to relatively pivot the mold portions together, said ears at said other end of the respective sub-laminations being disposed to permit securing the mold portions together opposite to said pivot pin by a locking pin, a removable locking pin engaging said last mentioned ears, and means for locking the respective laminations and sub-laminations of the respective mold portions together, said locking means comprising heat conducting threaded tubes passing through the laminations and sub-laminations.

5. A mold formed of complemental mold portions, each mold portion comprising a plurality of laminations of substantially uniform thickness throughout their lengths, in alternation with a plurality of sub-laminations of the same uniform thickness throughout their lengths, the laminations including ears at a first common side of the complemental portions extending in the plane of the respective laminations beyond the sub-laminations at said first common side, the sub-laminations including ears at a second common side extending in the plane of the respective sub-laminations beyond the said laminations, the ears of the laminations of one portion extending between the ears of the laminations of the complemental portion in assembly and the ears of the sub-laminations of one portion extending between the ears of the sub-laminations of the complemental portion of the mold in assembly, said laminations and sub-laminations having transversely aligned registering surfaces to define in assembly a smooth-surfaced mold cavity, the respective laminations being in aligned relation transversely of the mold cavity with the respective sub-laminations, means for holding the complemental mold portions in assembly, said last means at the first common side comprising registering apertures formed in the respective aligned ears of the laminations, and a pin disposed in the respective registering apertures.

6. A mold formed of complemental portions defining a smooth surface mold cavity, each portion comprising a plurality of laterally juxtaposed laminations and sub-laminations of substantially equal and uniform thicknesses throughout, each of the plurality having surfaces defining portions of said smooth surfaced mold cavity, portions of the laminations spaced from the mold cavity-defining surfaces thereof comprising first ears, with said first ears extending beyond the respective interposed alternate sub-laminations in general alignment substantially longitudinally of the mold at a first common side of said mold, portions of the sub-laminations spaced from the mold cavity-defining surfaces comprising second ears, with the said second ears extending beyond the respective interposed alternate laminations in general alignment substantially longitudinally of the mold at a second common side of said mold, means compressing the said plurality transversely of the respective laminations and sub-laminations to form each portion as a rigid entity having two series of aligned respectively spaced ears at the sides of each mold portion, with the spacing between contiguous ears of said uniform thickness, said portions in assembly interleaving the said first ears at said common first side and said second ears at said second common side to form two substantially solid columns of ears at the said sides, and means for holding the mold portions in such assembly.

7. A mold formed of complemental portions defining a smooth surfaced mold cavity, each portion comprising a plurality of laterally juxtaposed laminations and sub-laminations of substantially equal and uniform thicknesses throughout, each of the plurality having surfaces defining portions of said smooth surfaced mold cavity, portions of the laminations spaced from the mold cavity-defining surfaces thereof comprising first ears, with said first ears extending beyond the respective interposed alternate sub-laminations in general alignment substantially longitudinally of the mold at a first common side of said mold, portions of the sub-laminations spaced from the mold cavity-defining surfaces comprising second ears, with the said second ears extending beyond the respective interposed alternate laminations in general alignment substantially longitudinally of the mold at a second common side of said mold, means compressing the said plurality transversely of the respective laminations and sub-laminations to form each portion as a rigid entity having two series of aligned respectively spaced ears at the sides of each mold portion, with the spacing between contiguous ears of said uniform thickness, said portions in assembly interleaving the said first ears at said common first side and said second ears at said second common side to form two substantially solid columns of ears at the said sides, means for holding the mold portions in such assembly, supporting means, and a supporting ear mounted on the supporting means having the same said uniform thickness, one of said laminations terminating short of and providing a space between adjacent first ears, said supporting ear disposed in said space to complete the said solid column of overlapping interleaved ears at said first side of the mold while supporting the mold at said side.

MARTIN LARSON.

References Cited in the file of this patent

UNITED STATES PATENTS

| Number | Name | Date |
| --- | --- | --- |
| Re. 12,703 | Corcoran | Oct. 22, 1907 |
| 604,258 | Menier | May 17, 1898 |
| 853,099 | Livingstone | May 7, 1907 |
| 1,300,399 | Jenkins | Apr. 15, 1919 |
| 1,605,358 | Louisot | Nov. 2, 1926 |
| 1,897,023 | Schirmer | Feb. 7, 1933 |
| 1,984,384 | Sheffield | Dec. 18, 1934 |
| 2,266,831 | Tegarty | Dec. 23, 1941 |
| 2,274,060 | Hart | Feb. 24, 1942 |
| 2,317,597 | Ford et al. | Apr. 27, 1943 |
| 2,330,371 | Miller | Sept. 28, 1943 |
| 2,372,418 | Forbes et al. | Mar. 27, 1945 |
| 2,550,252 | Jendrisak | Apr. 24, 1951 |

FOREIGN PATENTS

| Number | Country | Date |
| --- | --- | --- |
| 8,622 | Great Britain | 1901 |
| 845,786 | France | May 22, 1939 |